United States Patent [19]

Suzuka

[11] Patent Number: 5,367,351
[45] Date of Patent: Nov. 22, 1994

[54] CAMERA HAVING A VARIABLE PHOTOGRAPHING APERTURE

[75] Inventor: Shinya Suzuka, Saitama, Japan

[73] Assignee: Asahi Kogaku Kogyo Kabushiki Kaisha, Tokyo, Japan

[21] Appl. No.: 45,197

[22] Filed: Apr. 13, 1993

[30] Foreign Application Priority Data

Apr. 13, 1992 [JP] Japan .................... 4-092500

[51] Int. Cl.⁵ ............................................. G03B 17/02
[52] U.S. Cl. .................................................... 854/159
[58] Field of Search .............. 354/94, 195.12, 222, 354/159, 484, 486

[56] References Cited

U.S. PATENT DOCUMENTS 3,470,805 10/1969 Suzuki et al.
3,978,503 8/1976 Shono.
4,864,338 9/1989 Wakabayashi ............. 354/195.12
5,010,357 4/1991 Misawa.

FOREIGN PATENT DOCUMENTS 2244144 11/1991 United Kingdom ........... 354/159

Primary Examiner—David M. Gray
Attorney, Agent, or Firm—Sandler, Greenblum & Bernstein

[57] ABSTRACT

A camera capable of photographing with a plurality of photographing aperture sizes. Circuitry is provided to which electrical power is to be supplied; and a single operating member is capable of setting at least three different operating conditions. The circuitry is turned ON or OFF and a photographing aperture size is set to one of the plurality of photographing aperture sizes depending upon the operation condition set by the single operating member.

19 Claims, 8 Drawing Sheets

CAMERA HAVING A VARIABLE PHOTOGRAPHING APERTURE

BACKGROUND OF THE INVENTION

The present invention relates to a camera having a changeover mechanism capable of changing the photographing aperture. The photographing aperture as defined here relates to the size of the opening (inside the camera body) directly in front of the film, that determines the size of the exposed area (and therefore the aspect ratio of the exposed area) of each frame of the film.

Recently, cameras have been developed that have changeover mechanisms for selecting a photographing aperture size from among: a standard size (large photographing aperture size), panorama size, half size (small photographing aperture size), and so on. Thus, in this type of the camera, there is provided a changeover switch for changing over the photographing aperture sizes. Besides the changeover switch, the camera is further provided with a power switch to turn ON/OFF the circuitry of the camera, and other operation switches. Since the number of switches of the camera increases, the operation becomes complicated and confusing.

SUMMARY OF THE INVENTION

It is therefore an object of the present invention to provide an improved camera having a photographing aperture size changeover mechanism in which the complicated operation can be avoided.

For the above object, according to the present invention, there is provided a camera capable of photographing with a plurality of photographing aperture sizes, wherein the camera includes:
 circuitry to which electrical power is to be supplied;
 a single operating member capable of setting three or more different operation conditions;
 control means for turning on or off the circuitry and for selecting the photographing aperture size from among one of the plurality of photographing aperture sizes depending upon the operating conditions set by the single operating member.

Optionally, the camera can be provided with a mechanism for changing the photographing aperture size, where the single operating member includes an engaging portion to be engaged with the mechanism, and the photographing aperture size changes depending upon the position of the operating member. In such a case, the mechanism changes the photographing aperture size between a large size and a small size. When at the rest position, the mechanism sets the photographing aperture size to the large size. When the mechanism engages the engaging portion, the photographing aperture size is set to the small size. The engaging portion disengages from the mechanism when the single operating member is located at a position corresponding to the turning off of the circuitry.

According to another aspect of the invention, there is provided a camera capable of photographing with a plurality of photographing aperture sizes, wherein the camera includes:
 circuitry to which electrical power is to be supplied;
 a single operating member capable of setting three or more different operating conditions;
 control means for changing a photographing aperture size into one of the plurality of photographing

2 aperture sizes in accordance with at least two conditions of the three or more different operating conditions, the electrical power being supplied to the circuitry when one of the at least two conditions is set.

According to a further aspect of the invention, there is provided a camera capable of photographing with a plurality of photographing aperture sizes, wherein the camera includes:
 circuitry to which electrical power is to be supplied;
 a single operating member capable of setting three or more different operating conditions;
 control means for turning off the circuitry when a predetermined one of the three or more different operating conditions is set, while the control means turns on the circuitry and sets a photographing aperture size to one of the plurality of photographing aperture sizes when one of the other operating conditions is set.

DESCRIPTION OF THE ACCOMPANYING DRAWINGS

DESCRIPTION OF THE EMBODIMENTS

Figure 7:
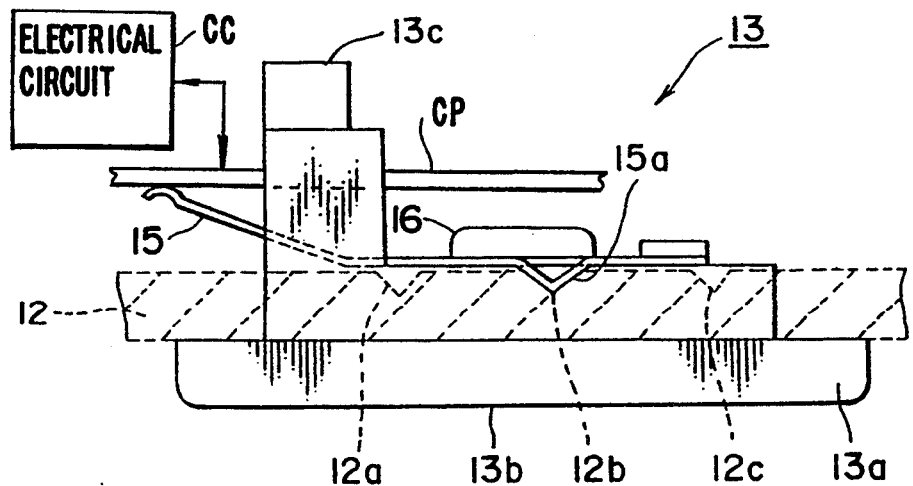
FIG. 7 is a top view of a switch.
Figure 8:
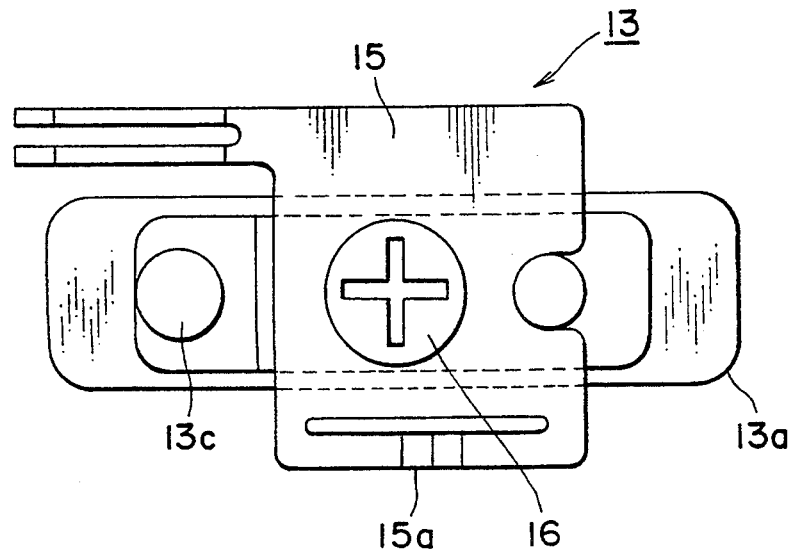
FIG. 8 is a side view of the switch.
Figure 9:
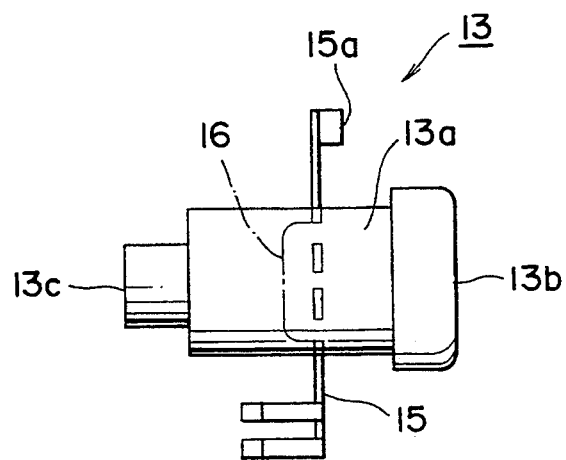
FIG. 9 is a front view of the switch.
Figure 10:
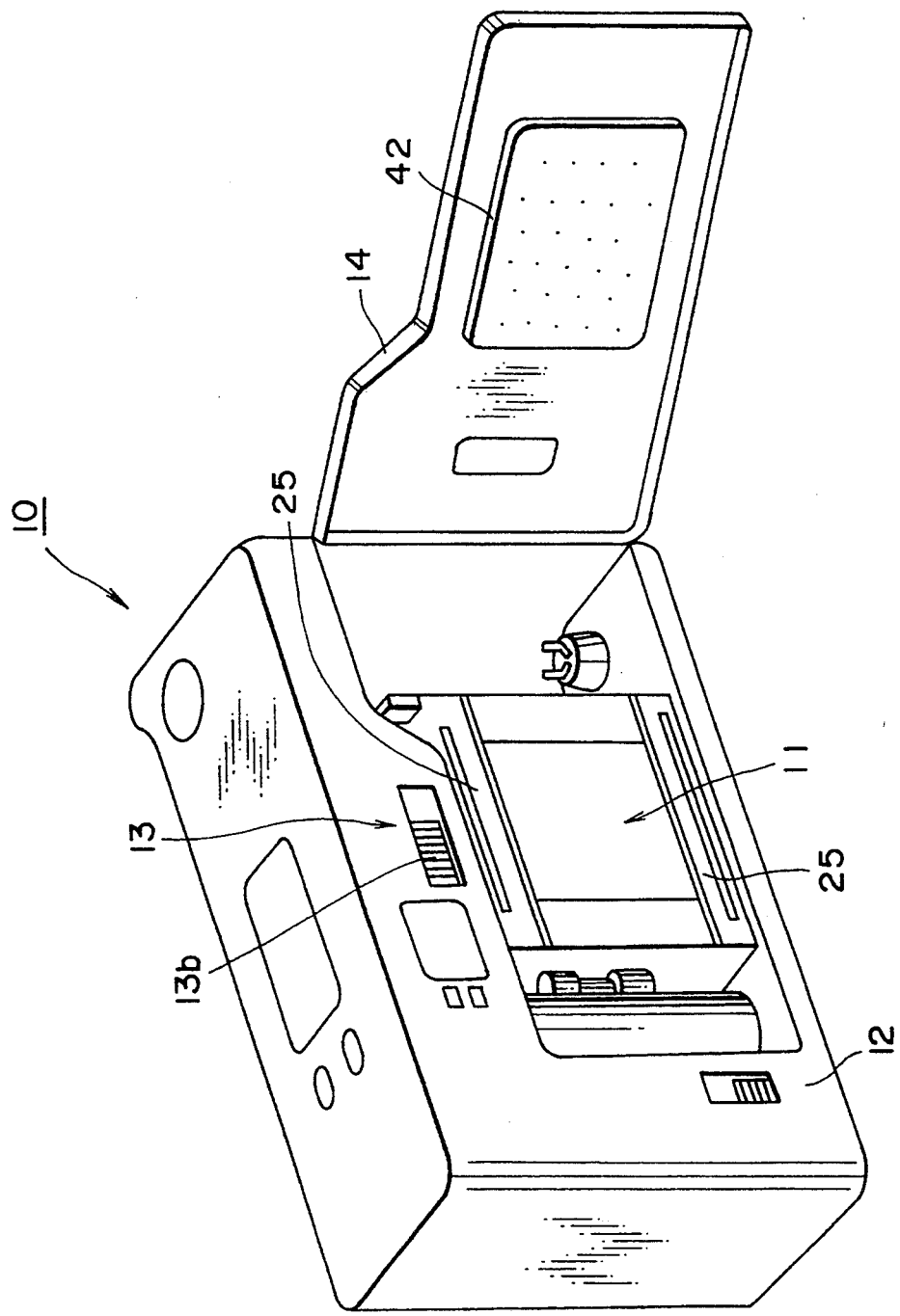
FIG. 10 is an external perspective view of a camera having a photographing aperture size changeover mechanism to which the present invention is applied.

The present invention will be described below with reference to embodiments shown in the figures. As shown in FIG. 10, a switch 13 (changeover means) having the function as an operation switch for the power supply circuit of a camera 10 and the function as an operation switch for a photographing aperture size changeover mechanism is disposed at the upper portion of the rear wall 12 of the camera 10. The structure of the switch 13 is shown in FIGS. 7 to 9. The switch main body 13a is inserted into an inserting hole (not shown) formed on the rear wall 12 and having a predetermined length in the right and left directions in FIG. 7, with the operation unit 13b thereof located on the outside of the rear wall 12. Then, a contact brush 15 is fixed to the switch main body 13a by a screw 16 and attached to the inner surface of the rear wall 12 by said screw 16. The switch main body 13a can slide in the right and left directions in FIG. 7 with respect to the rear wall 12 within the range of the length of the aforesaid inserting hole (not shown). An engaging portion 15a formed to a portion of the contact brush 15 can be engaged with one of the right, middle or left grooves 12a, 12b or 12c respectively formed on the inner surface of the rear wall 12, and can be stopped by a click. The contact brush 15 can slide to contact a contact plate CP (FIG. 7) to turn ON and OFF the power supply circuit CC of the camera 10. When the switch 13 is stopped by click on the left side, the power supply is turned OFF (photographing is prohibited); when the switch 13 is stopped by click at the mid position, as illustrated in FIG. 7, the power supply is turned ON (photographing is enabled) and photographing is enabled with a standard photographing aperture size (large photographing aperture size), and when it is stopped by a click on the right side, the power supply is turned ON (photographing is enabled) and photographing can be effected using a panorama photographing aperture size (small photographing aperture size). FIG. 7 shows the condition that the switch 13 is at the mid position of the click stop. An engaging pin 13c is integrally provided with the switch main body 13a. The engaging pin 13c functions when a photographing aperture size is changed as it is engaged with the engaging projection 26c of a drive ring 26 to be described below.

A chassis 25 is fixed to the object side surface (i.e., inner surface) of the rear wall 12 at the upper and lower positions of an opening 11 in the camera 10 by a known means. The chassis 25 determines the size of the opening 11 in the upper and lower directions when a large photographing aperture size is selected. Further, as shown in FIGS. 1 to 6, the chassis 25 functions as a base plate for supporting a pair of upper and lower light shading plates 21 (partial light shading member); an annular drive ring 26 provided to support and move the light shading plates 21; a drive lever 22; and associated hardware.

The drive ring 26 is an annular member surrounding the opening 11 and disposed just in front of the light shading plates 21 in the optical axis direction. When a photographer operates the switch 13, the drive ring 26 is rotated to move the light shading plates 21 using a linkage structure composed of drive levers 22, 23.

The photographing aperture size changeover mechanism will be described in detail below.

The chassis 25 includes pin portions 25a protruding on the object side. The drive ring 26 includes slots 26a into which the pin portions 25a are inserted. Thus the drive ring 26 is rotatable within the range of the length of the slots 26a. Further, the drive ring 26 is biased in the clockwise direction by spring 27 as shown in the figure. The spring 27 has an end hooked to a locking projection 26b, which is formed at the lower portion of the drive ring 26 and extending in a radial direction, and the other end hooked to a spring hook 28 disposed on the chassis 25. A locking pin 29 disposed on the chassis 25 regulates the rotating range of the drive ring 26 by contacting the locking projection 26b. Further, the drive ring 26 includes an engaging projection 26c at the upper portion thereof, which can engage with the engaging pin 13c when the aforesaid switch 13 is moved.

One end of the drive levers 22, 23 are rotatably engaged with pins 24 which are disposed on the surface of the light shading plates 21 on an object side, and arranged side by side in a horizontal direction. The other ends of the drive levers 22 are rotatably engaged with the pins 25a, respectively, which are formed to the chassis member 25. Similarly, the other ends of the drive levers 23 are rotatably engaged with the pins 26d formed to the drive ring 26. The aforesaid drive levers 22, 23 are connected to a connecting pin member 30 at the position where they intersect with each other so as to be rotatable about the connecting pin member 30.

Each of the upper and lower light shading plates 21 has two straight advance guide pins 21a protruding on the film side. The light shading plates 21 can be moved up and down and are supported in such a manner that the straight advance guide pins 21a are engaged with the corresponding straight advance guide grooves 25b formed on the chassis 25.

Figure 1:
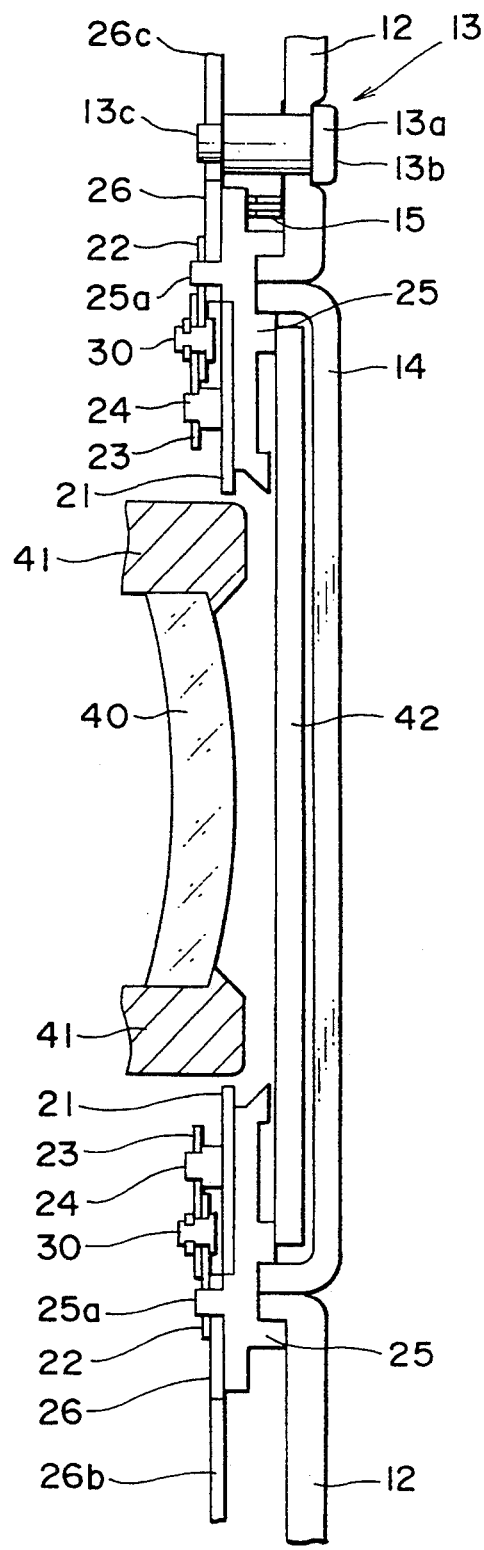
FIG. 1 is a top cross-sectional view showing the main structure of an embodiment of a camera to which the present invention is applied.
Figure 2:
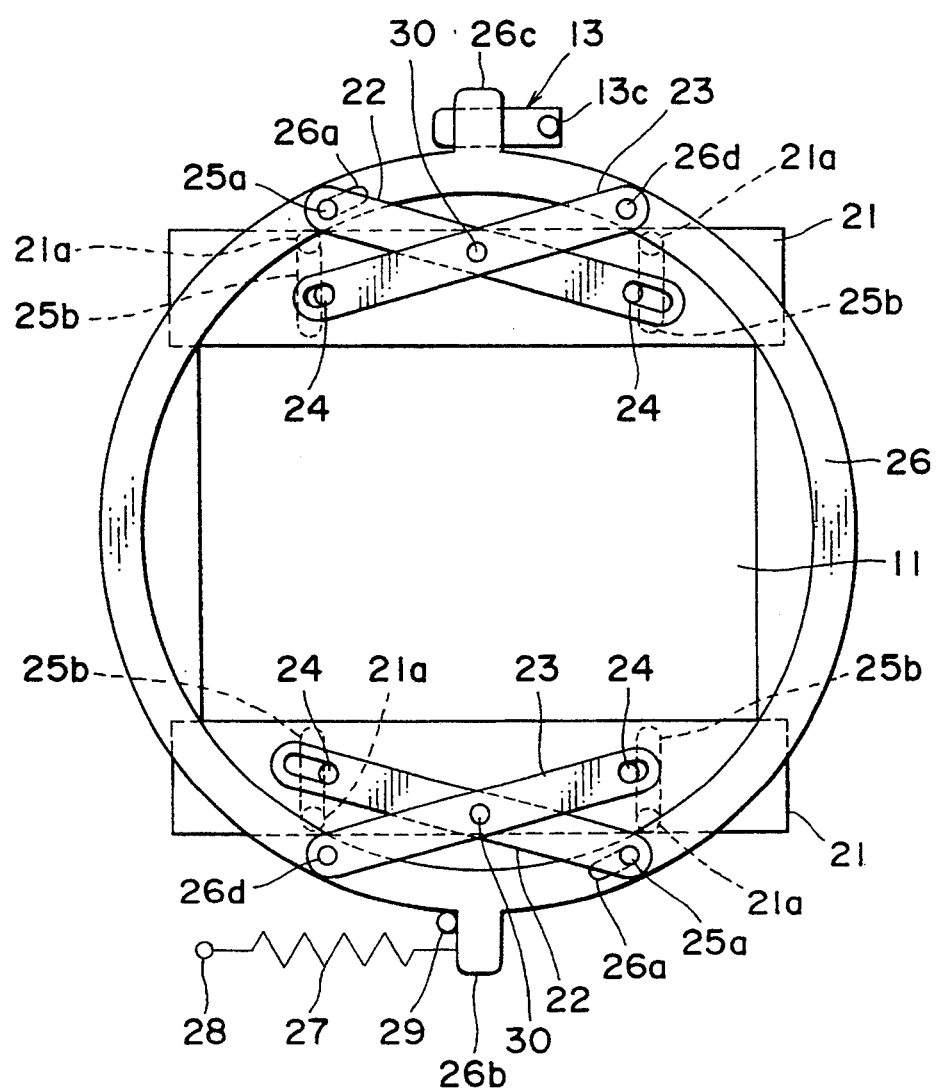
FIG. 2 is a schematic front view corresponding to FIG. 1 showing the main structure of the embodiment.

With the above arrangement, the camera 10 having the photographing aperture size changeover mechanism according to the present invention operates as follows. FIGS. 1 and 2 show the condition when the power supply circuit of the camera 10 is turned OFF. In this condition, the switch 13 is stopped by the click on the left side in FIG. 7 and the engaging pin 13c is not engaged with the engaging projection 26c. When the drive ring 26 is driven counterclockwise, the pair of upper and lower light shading plates 21 are moved toward the center of the opening 11. Since, however, the drive ring 26 is always forced clockwise by the spring 27, the light shading plates 21 remain at a retracted position in this condition. The camera 10 according to the present invention has a known structure such that when the power supply circuit is turned OFF, the photographing lens barrel 41 (photographing optical system) of the camera 10 retracts inward, and when the power supply circuit is turned ON, the photographing lens barrel 21 advances forward. Therefore, when the power supply circuit is turned OFF, the photographing lens barrel 41 is fully retracted in the optical axis direction, and since the light shading plates 21 do not advance into the opening 11 at this accommodated position, the accommodation of the photographing lens barrel 41 is completed without interference from the light shading plates 21. Note, a number 40 in the figure designates a rear group of the photographing lens system (photographing optical system).

Figure 3:
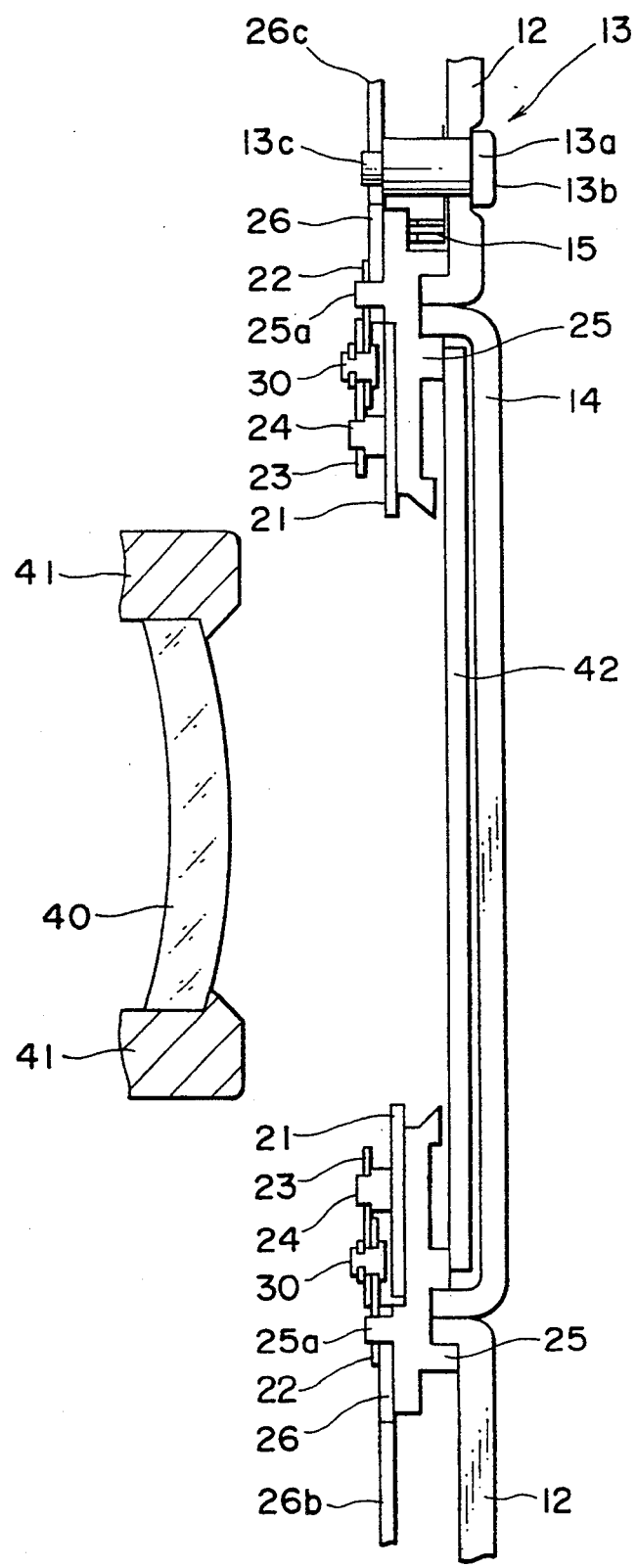
FIG. 3 is a top cross-sectional view showing the main structure of the embodiment in a state different from that shown in FIG. 1.
Figure 4:
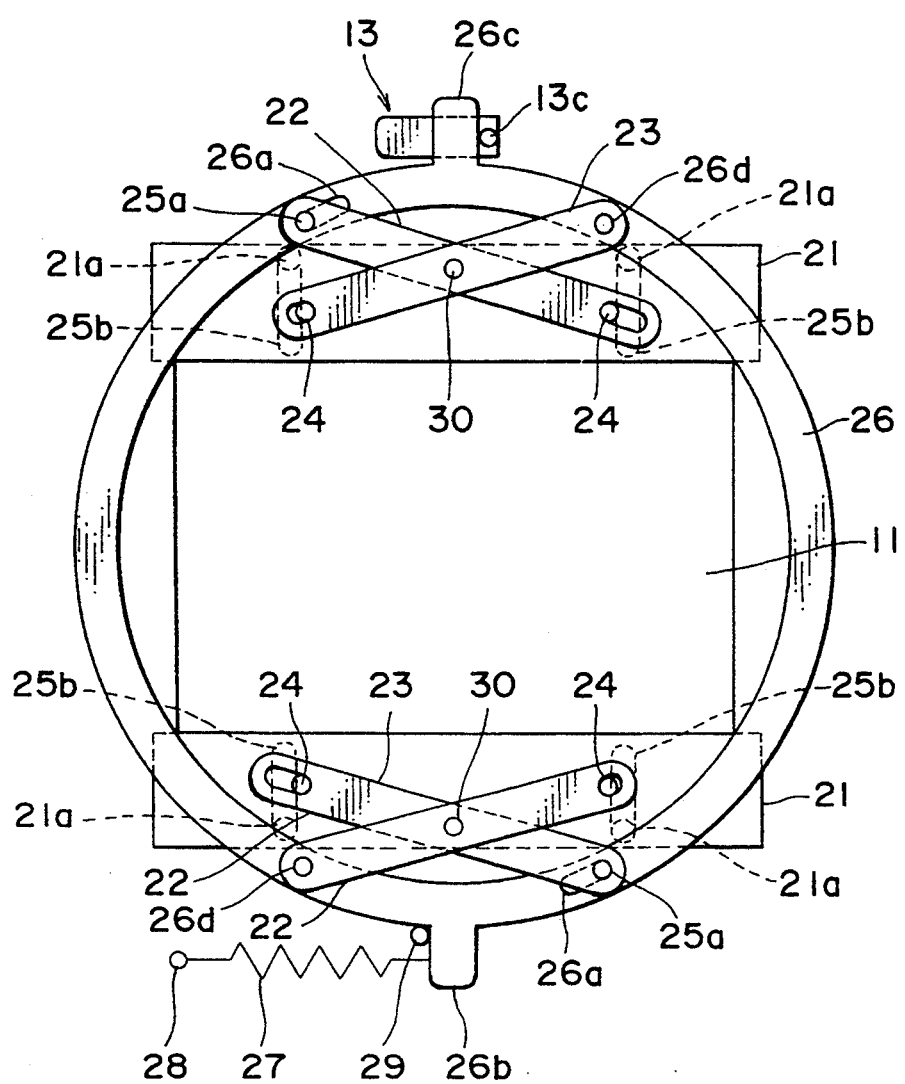
FIG. 4 is a schematic front view corresponding to FIG. 3 showing the main structure of the embodiment.

FIGS. 3 and 4 show the condition that photographing with a standard photographing aperture size is enabled. The switch 13 is in the condition shown in FIG. 7, i.e., in the click stop state at the mid position. Although the engaging pin 13c of the switch 13 contacts the engaging projection 26c, it does not move the engaging projection 26c left in the figure. Therefore, the light shading plates 21 are not moved from the state shown in FIG. 2 and remain in the retracted position (at the position of the large photographing aperture size). As soon as the power supply circuit is turned ON, the photographing lens barrel 41 advances toward the object and is ready for photographing. In this state, the engaging pin 13c does not necessarily contact the engaging projection 26c.

Figure 5:
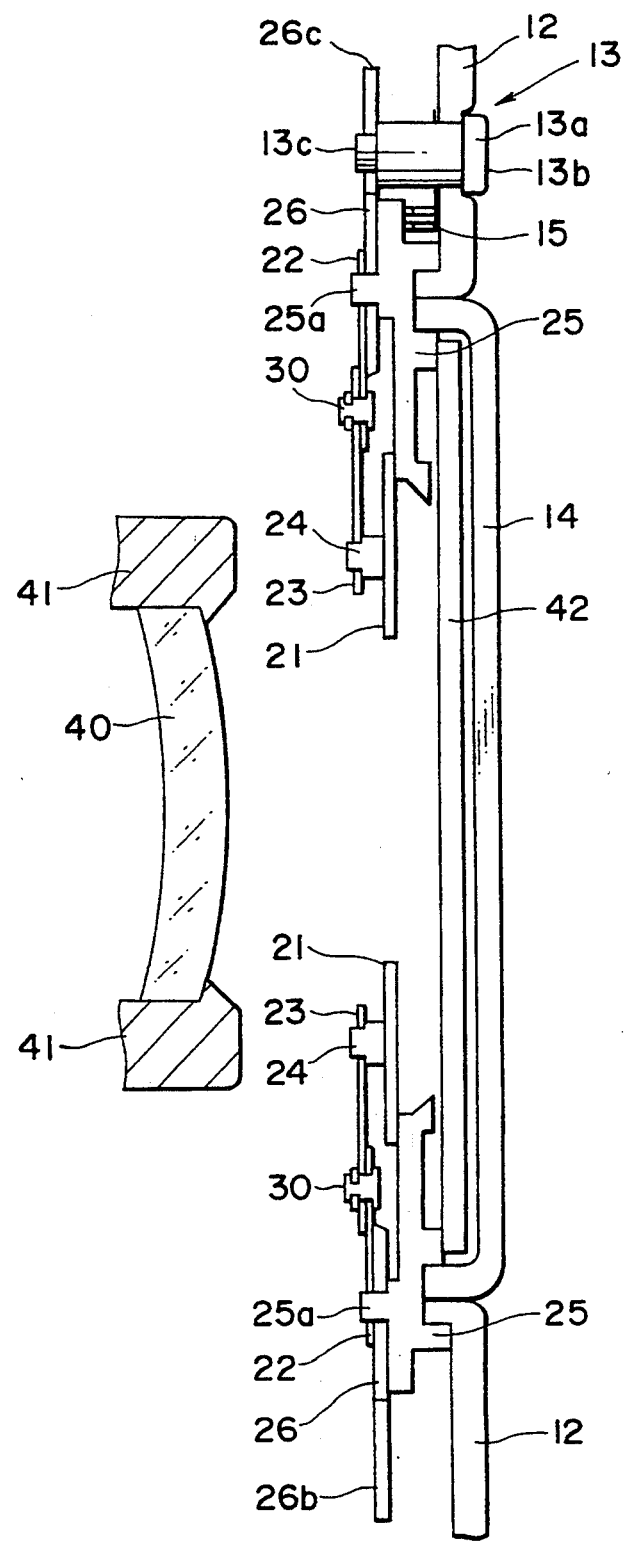
FIG. 5 is a top cross-sectional view showing the main structure of the embodiment in a state different from those shown in FIGS. 1 and 2.
Figure 6:
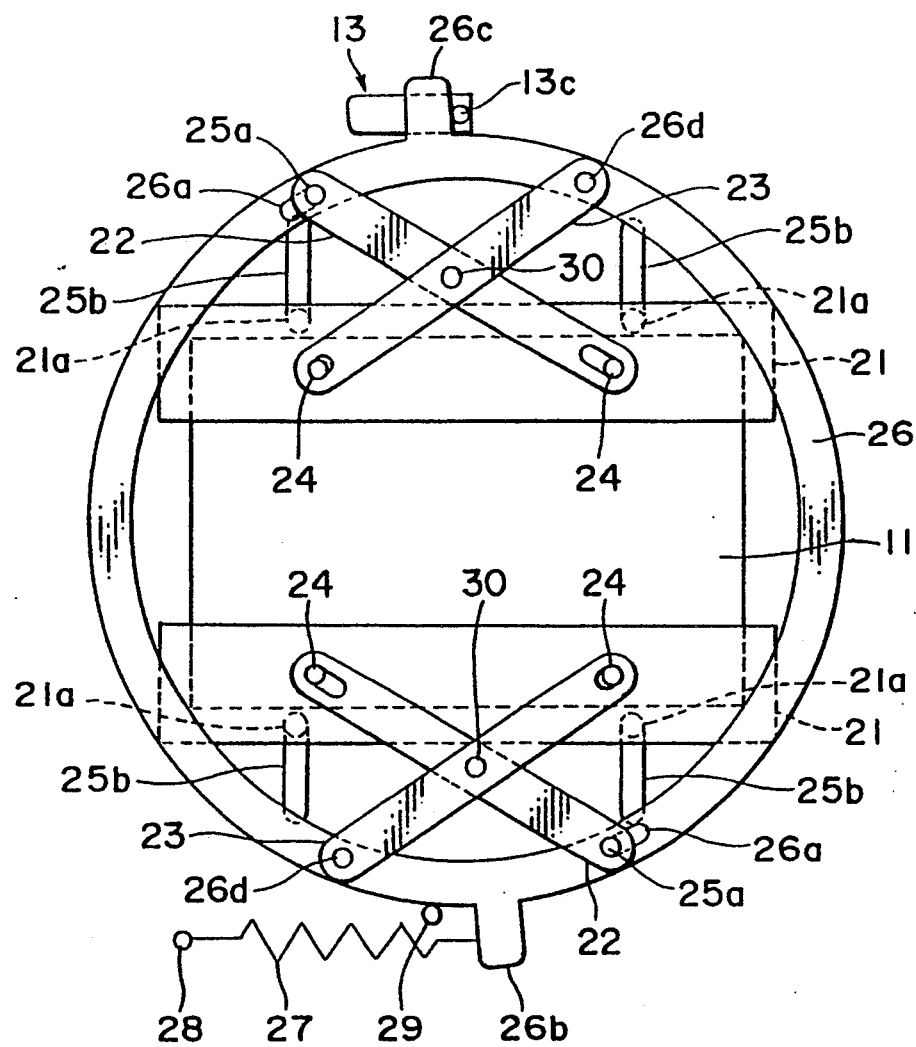
FIG. 6 is a schematic front view corresponding to FIG. 5 showing the vicinity of the main structure of the embodiment.

FIGS. 5 and 6 show the condition that photographing with a panorama photographing aperture size is enabled. In this condition, the switch 13 is further operated so that it is stopped by the click on the right side in FIG. 7. The engaging pin 13c of the switch 13 further depresses the engaging projection 26c to the left as shown in the figure. The drive ring 26 is thus rotated clockwise. The rotation of the drive ring 26 causes the light shading plates 21 to advance towards the center of opening 11. The drive levers 23, connecting pin members 30, drive levers 22 and pins 24 move to change the photographing aperture size to the panorama size. Note, the force holding (i.e., click stopping) the switch 13 is stronger than the return force of the spring 27.

When the photographing enabling state in the panorama size shown in FIGS. 5 and 6 is changed to the standard photographing aperture size or to the condition that the power supply circuit is turned OFF, the engaging pin 13c of the switch 13 is released from the engagement with the engaging projection 26c of the drive ring 26. Therefore, the drive ring 26 is rotated clockwise by the force of the spring 27, and the light shading plates 21 are retracted to be away from each other.

Although the small photographing aperture size is defined as the panorama photographing aperture size in the embodiment, the light shading plates may be arranged to move in a horizontal direction (i.e., in the film feed direction) so that the small photographing aperture size is defined as a half photographing aperture size.

According to the present invention, the ON/OFF operation of the camera and the switching the photographing aperture size are performed by operating a single operation member; which improves the operability of the camera. Further, since the number of the parts can be reduced, the production cost can be reduced.

The present disclosure relates to subject matter contained in Japanese Patent Application No. HEI 4-92500, filed on Apr. 13, 1992, which is expressly incorporated herein by reference in its entirety.

What is claimed is:

1. A camera capable of photographing with a plurality of photographing aperture sizes, said camera comprising:
   circuitry to which electrical power is to be supplied;
   a single operating member capable of setting at least three different operating conditions of the camera, said single operating member comprising a manually operable, linearly movable member, linear movement of said linearly movable member providing a source of motive force for changing a photographic aperture size; and
   control means for turning said circuitry ON or OFF and for changing a photographing aperture size from among one of said plurality of photographing aperture sizes depending upon the operating condition set by said single operating member, said control means comprising conversion means for converting said linear movement of said linearly movable member into a rotary movement, for converting said rotary movement into a further linear movement, and for changing a photographing aperture size by said further linear movement.

2. The camera according to claim 1, wherein said single operating member comprises a slide switch capable of being located in at least three different positions, which correspond to said at least three different operating conditions, respectively.

3. The camera according to claim 1, wherein said plurality of photographing aperture sizes comprise a standard photographing aperture size, and a smaller photographing aperture size than said standard photographing aperture size.

4. The camera according to claim 3, wherein said smaller photographing aperture size comprises a panorama size.

5. The camera according to claim 1, further comprising a mechanism for changing the photographing aperture size, and wherein said single operating member comprises an engaging portion to be engaged with said mechanism, whereby said photographing aperture size is changed depending upon the position of said operating member.

6. The camera according to claim 5, wherein said mechanism changes said photographing aperture size between a large size and a small size, said mechanism, in its rest position, setting said photographing aperture size to said large size, while said photographing aperture size is set to said small size when said engaging portion engages said mechanism.

7. The camera according to claim 6, wherein said engaging portion disengages from said mechanism when said single operating member is located at a position corresponding to turning off of said circuitry.

8. The camera according to claim 5, wherein said mechanism comprises a pair of light shading plates movable with respect to each other.

9. The camera according to claim 1, further comprising a photographing lens which can be retracted inwardly to a non-photographing position, from a photographing position.

10. The camera capable of photographing with a plurality of predetermined photographing aperture sizes according to claim 1, said conversion means comprising an engaging member integrally formed with said linearly movable member, an annular drive ring mounted for rotation and rotatable in response to movement of said engaging member, said annular drive member coupled to a plurality of light shading plates, said annular drive member further providing a motive force for movement of said light shading plates to define said plurality of photographing aperture sizes.

11. The camera capable of photographing with a plurality of predetermined photographing aperture sizes according to claim 10, said annular drive ring comprising an engagement projection positioned to bear against said engaging member of said manually operable member, and means for biasing said engagement projection against said engagement member in at least one position of said linearly movable member.

12. The camera capable of photographing with a plurality of predetermined photographing aperture sizes according to claim 11, further comprising one position of said linearly movable member wherein said engagement projection of said annular drive member is spaced from said engaging member of said linearly movable member.

13. The camera capable of photographing with a plurality of predetermined photographing aperture sizes according to claim 1, said control means further comprising means, when said circuitry is ON, for changing said photographing aperture size, among said plurality of photographing aperture sizes.

14. A camera capable of photographing with a plurality of predetermined photographing aperture sizes, said camera comprising:
   circuitry to which electrical power is to be supplied;
   a single operating member capable of setting at least three different operating conditions of said camera, said single operating member comprising a manually operable, linearly movable member, linear movement of said linearly movable member providing a source of motive force for changing a photographing aperture size; and
   control means for setting a photographing aperture size into one of said plurality of photographic aperture sizes in accordance with at least two conditions of said at least three different operating conditions, said electrical power being supplied to said circuitry when one of said at least two conditions is set, said control means comprising means for converting said linear movement of said linearly movable member into a rotary movement, for converting said rotary movement into a further linear movement, and for changing a photographing aperture size by said further linear movement.

15. The camera capable of photographing with a plurality of predetermined aperture sizes according to claim 14, said control means setting said at least two conditions of said at least three different operating conditions when said circuitry is ON.

16. A camera capable of photographing with a plurality of predetermined photographing aperture sizes, said camera comprising:

circuitry to which electrical power is to be supplied;
   a single operating member capable of setting at least three different operating conditions of the camera, said single operating member comprising a manually operable, linearly movable member, linear movement of said linearly movable member providing a source of motive force for changing a photographing aperture size; and
   control means for turning said circuitry OFF when a predetermined one of said at least three different operating conditions is set, while said control means turns said circuitry ON, and sets a photographing aperture size to one of said plurality of photographing aperture sizes when another of said at least three different operating conditions is set, said control means comprising means for converting said linear movement of said linearly movable member into a rotary movement, for converting said rotary movement into a further linear movement, and for changing a photographing aperture size by said further linear movement.

17. The camera capable of photographing a plurality of predetermined photographing aperture sizes according to claim 16, where said control means turns said circuitry ON when two of said at least three different operating conditions are set.

18. A camera capable of photographing with a plurality of predetermined photographing aperture sizes, said camera comprising:

circuitry to which electrical power is to be supplied;
   a first mechanism for changing the photographing aperture size;
   a second mechanism turning said circuitry ON and OFF;
   wherein said first mechanism and said second mechanism comprise a single member, said single member comprising a manually operable, linearly movable member, linear movement of said linearly movable member providing a source of motive force for changing a photographing aperture size, further comprising conversion means for converting linear movement of said linearly movable member into a rotary movement, for converting said rotary movement into a further linear movement, and for changing a photographing aperture of said camera by said further linear movement.

19. The camera capable of photographing with a plurality of predetermined aperture sizes according to claim 18, further comprising an engagement member integrally formed with said linearly movable member, said engagement member contacting said conversion means in at least one position of said linearly movable member and being spaced from said conversion means in another position of said linearly movable member.

* * * * *

UNITED STATES PATENT AND TRADEMARK OFFICE
CERTIFICATE OF CORRECTION

PATENT NO. : 5,367,351
DATED : November 22, 1994
INVENTOR(S) : Shinya SUZUKA

It is certified that error appears in the above-indentified patent and that said Letters Patent is hereby corrected as shown below:

At the cover sheet, section [57], line 1 of the abstract, change "camera capable" to ---camera is capable---.
    At column 5, line 29, (claim 1, line 2), change "photographing" --predetermined photographing --.

Signed and Sealed this

Twenty-seventh Day of June, 1995

Attest:

BRUCE LEHMAN

*Attesting Officer*     *Commissioner of Patents and Trademarks*